No. 728,811. Patented May 19, 1903.

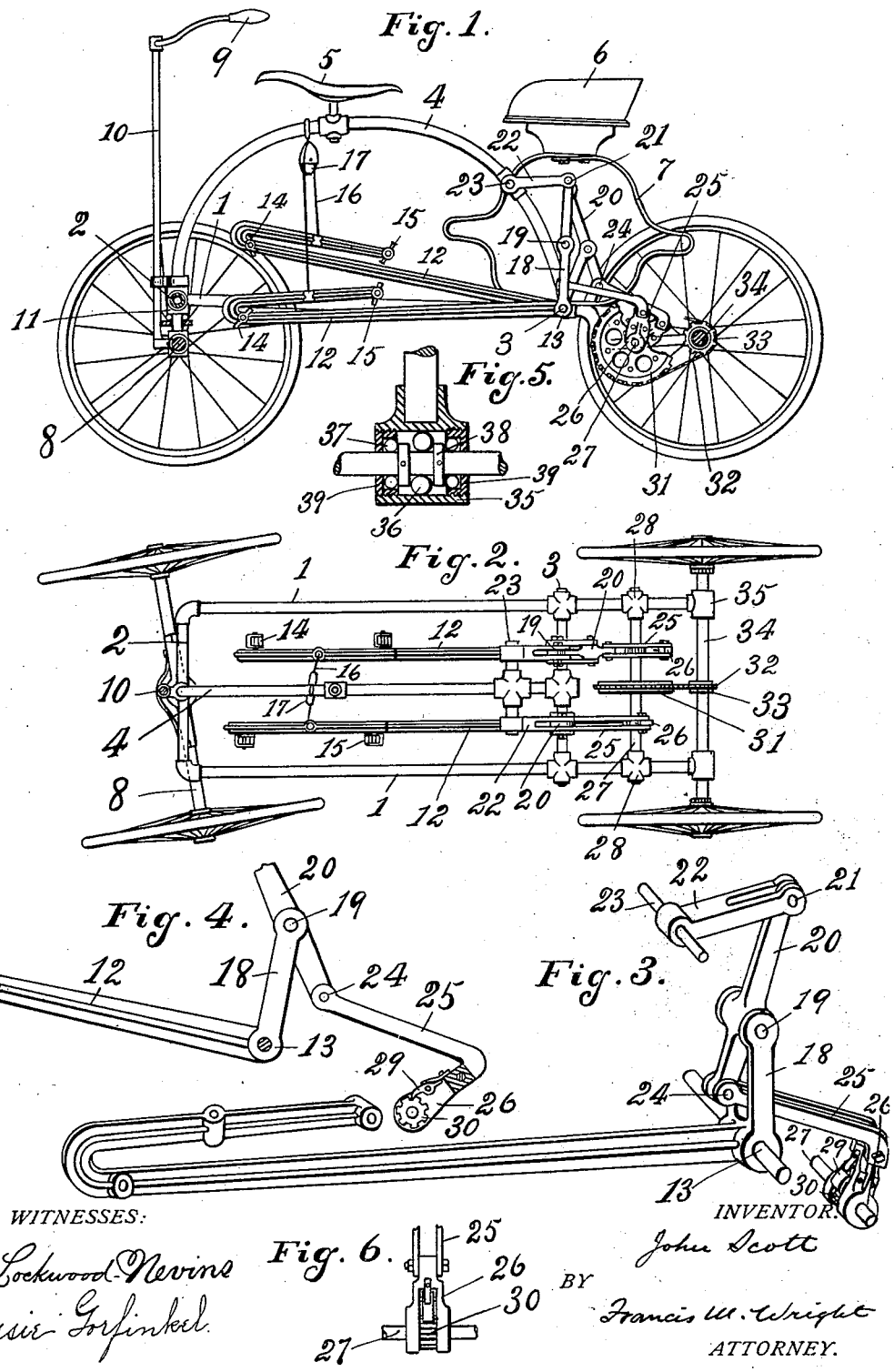

UNITED STATES PATENT OFFICE.

JOHN SCOTT, OF SAN FRANCISCO, CALIFORNIA.

LEVER-VEHICLE.

SPECIFICATION forming part of Letters Patent No. 728,811, dated May 19, 1903.

Application filed June 30, 1902. Serial No. 113,877. (No model.)

*To all whom it may concern:*

Be it known that I, JOHN SCOTT, a citizen of the United States, residing at San Francisco, in the county of San Francisco and State of California, have invented certain new and useful Improvements in Lever-Operated Vehicles, of which the following is a specification.

My invention relates to improvements in lever-propelled vehicles, the object of my invention being to provide a vehicle which shall be operated, preferably, by foot-power through the instrumentality of levers, so as to obtain a long stroke and a large leverage and so that the vehicle may be as easy-running as possible. It is especially adapted for use by two riders, both of whom may simultaneously propel the vehicle.

My invention resides in the novel construction, combination, and arrangement of parts for the above ends, hereinafter fully specified, and particularly pointed out in the claims.

In the accompanying drawings, Figure 1 is a longitudinal vertical section of the apparatus. Fig. 2 is a plan view of the same, the seats being removed. Fig. 3 is an enlarged perspective view of one of the compound levers in one position. Fig. 4 is a similar view of a portion of the lever in another position. Fig. 5 is a horizontal section through the bearing of the rear axle. Fig. 6 is a detail of one of the ratchet-wheels.

Referring to the drawings, the frame of the vehicle comprises the side bars 1, the front cross-bar 2, the rear cross-bar 3, and the central arched bar 4.

5 and 6 are the front and rear seats, the former supported upon the central arched bar 4 and the latter upon springs 7, supported by the side bars.

8 represents the front axle, upon which the front portion of the frame rests revolubly, said front axle being turned by means of the steering-handles 9 and the steering-post 10, attached to said front axle and connected by means of a bearing 11, loose upon the lower portion of the central arched bar 4.

12 represents the operating-levers, which are fulcrumed upon the bar 3, as shown at 13, and extend forwardly therefrom to the treadles 14 for the front rider and are then bent backward upon themselves to the treadles 15 for the rear rider. To said levers is attached a chain or cord 16, which is passed over a small roller 17, secured upon the under side of the arched bar 4. The effect of this construction is that when either of the levers is depressed by pressure upon the treadle the other lever is correspondingly raised. Each lever has formed integral therewith an upstanding arm 18, which is connected, as shown at 19, with a bar 20, the latter being pivoted at its upper end, as shown at 21, to an arm 22, swinging from a pivot 23 upon the central arched bar 4. Thus the downward pressure of the lever 12 causes the upper end of the arm 18 to swing forward, thereby vibrating forward also the lower end of the bar 20. Each of said bars 20 is extended downward below its connection 19 with the arm, and to the lower ends of said bars are pivotally attached, as shown at 24, the upper ends of bent arms 25, the lower members of which are connected to crank-arms 26, loose upon a counter-shaft 27, extending across between the side members 1 of the frame and having its ends in bearings 28 on said side bars. Each crank carries a spring-actuated dog 29, which engages with a ratchet-wheel 30, fastened upon said shaft. Upon said shaft is secured a sprocket-wheel 31, which is connected, by means of a sprocket-chain 32, with a sprocket-pinion 33 upon the rear axle 34, said rear axle rotating in bearings 35, carried on the ends of the side members 1.

The operation of the device is therefore as follows: Upon depressing the left-hand lever by means of the treadles the lower end of the bar 20 swings forward, so that the upper end of the loose crank 26 also swings forward, causing the dog 29 to engage a tooth of the ratchet-wheel 30 and propel the shaft forward. This rotary movement is transmitted to the rear axle at an increased velocity. In the meantime the lever on the right was ascending and the arm 18 thereof swinging rearwardly, thereby moving the lower end of the corresponding bar 20 and also the corresponding crank-arm 26 rearwardly, causing the dog 29 to slip over the teeth of the ratchet-wheel to assume a new position for a forward movement.

In each bearing 28 the rear axle revolves on balls 36, and smaller balls 37, between collars 38 upon said shaft, and cup-shaped nuts 39, screwed within said bearing, prevent sidewise movement of the wheel-axle.

I claim—

1. In combination with the frame, the arms pivoted thereto, the bars pivotally connected with said arms, the treadle-levers pivotally mounted upon the frame and having arms pivotally connected with said bars, the links connected to the lower ends of said bars, the shaft, the ratchet-wheels thereon, and the dogs connected to said links and engaging said ratchet-wheels, substantially as described.

2. In combination with the frame, the arms pivoted thereto, the bars pivotally connected with said arms, the treadle-levers pivotally mounted upon the frame and having arms pivotally connected with said bars, the links connected to the lower ends of said bars, the shaft, the ratchet-wheels thereon, the dogs connected to said links and engaging said ratchet-wheels, the wheel-axle and the operative connection between said axle and said shaft, substantially as described.

3. In combination with the frame, the arms pivoted thereto, the bars pivotally connected with said arms, the treadle-levers pivotally mounted upon the frame having the front treadles at their forward end and bent back and having the rear treadles at the ends of their rearwardly-bent portions, and having arms pivotally connected with said bars, the links connected to the lower ends of said bars, the shaft, the ratchet-wheels thereon, and the dogs connected to said links and engaging said ratchet-wheels, substantially as described.

In witness whereof I have hereunto subscribed my name this 9th day of June, A. D. 1902.

JOHN SCOTT.

Witnesses:
T. W. McDONALD,
SIMEON POWELL.